Patented Jan. 9, 1951

2,537,638

UNITED STATES PATENT OFFICE 2,537,638

6,6-DIMETHYL-2-VINYL-BICYCLO-(3.1.1)-2-HEPTENE AND ITS PRODUCTION

Leland J. Kitchen, Akron, Ohio, assignor to The Firestone Tire & Rubber Company, Akron, Ohio, a corporation of Ohio No Drawing. Application March 17, 1949, Serial No. 82,006

2 Claims. (Cl. 260—666)

This invention relates to 6,6-dimethyl-2-vinyl-bicyclo-[3.1.1]-2-heptene and its production. This new compound, for which the trivial name "nopadiene" is suggested and used herein, is an optically active bicyclic hydrocarbon. It gave a positive test for conjugated unsaturation with p-nitrobenzenediazonium chloride reagent, as described in J. Am. Chem. Soc., 60, 168 (1938). Nopadiene containing benzoyl peroxide slowly polymerized under ultra-violet light to a sticky yellow solid. It retarded polymerization of acrylonitrile in an emulsion but slowly copolymerized with 1,3-butadiene. Thus, it may be put to use in a variety of different ways.

Nopadiene is produced by dehydration of 6,6-dimethyl-2-(2-hydroxyethyl)-bicyclo-[3.1.1]-2-heptene. This starting material may be obtained by condensation of formaldehyde with nopinene (beta-piene). This reaction is described in U. S. Patent 2,340,294 and in J. Am. Chem. Soc., 68, 638–641 (1946), and the trivial name "nopol" has there been assigned to the condensation product. Thus, the new product, which is a diene derived from nopol, is logically named "nopadiene." It is prepared according to the reaction illustrated in the following equation:

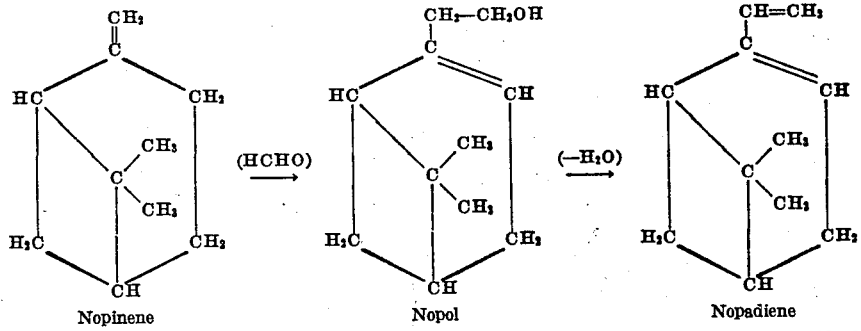

Nopinene          Nopol          Nopadiene

Various usual methods of dehydration cause cleavage of the dimethyl-substituted ring which is unstable at temperatures of about 210° C. and above. According to this invention dehydration is effected by a basic catalyst of the group consisting of oxides and hydroxides of metals of groups I to III of the periodic system, such as sodium hydroxide, potassium hydroxide, barium hydroxide, calcium oxide, magnesium oxide, alumina, strontium oxide, caesium hydroxide, lithium hydroxide, etc. The dehydration may be carried out by contacting the catalyst with the nopol, either in liquid phase or in vapor phase. The reaction is preferably carried out in the liquid phase with the nopol diluted by a water-soluble organic diluent boiling in the range of 180 to 210° C., with subsequent distillation of the mixture, and separation of the diluent from the desired distillate by washing with water. Diluents of other boiling range may be used effectively by carrying out the reaction under a vacuum or under pressure to control the temperature of the dehydration within the range of about 180 to 210° C., at which the reaction proceeds rapidly with minimum cleavage. There is little cleavage at 210° C.; at higher temperatures the rate of cleavage is rapidly increased.

The reaction may be carried out by merely heating nopol in the presence of the catalyst but it is preferable to use some miscible diluent in order to obtain better contact with the catalyst, provide ease of temperature control, and lower the rate of polymerization. Various inert organic diluents may be used. Diethyleneglycol diethyl ether is a preferred diluent because it boils at 188° C. and is miscible with water in all proportions. Tetramethyleneglycol dimethyl ether has been used, but to obtain a high yield the solution must be refluxed under a vacuum to prevent heating to temperatures at which cleavage proceeds at an undesirably high rate. Other diluents such as hexyl ether, ethylene glycol dibutyl ether, dipropylacetal, etc. may be employed.

The following examples illustrate the preparation of nopadiene:

Example 1

One hundred and sixty-six grams (one mole) of nopol was refluxed with 5.6 g. (0.1 mole) of potassium hydroxide under a short distillation column (Raschig rings; five theoretical plates) for ninety minutes. Material distilling below nopol was collected as it distilled, giving 16 ml. of water and 15 g. (10% yield) of crude nopadiene. Redistilled, the nopadiene boiled mainly at 74° C. (10 mm.); $n_D^{22}$ 1.5018. The reaction mixture, poured from catalyst and stripped under vacuum, gave 31 g. of distillate boiling up to 183° C. (3 mm.); and 95 g. of resin, solid when cool, remained in the still-pot.

*Example 2*

A mixture of 77 g. (0.46 mole) of nopol, 20 g. (0.36 mole) of potassium hydroxide, 0.5 g. of phenyl-beta-naphthylamine and 150 g. of diethylene glycol diethyl ether was refluxed under a column. The phenyl-beta-naphthylamine was used to inhibit polymerization. During about three hours 210 g. of distillate boiling in the range 98–185° C. was collected. After the distillate was washed thoroughly with water there remained 52 g. (75% yield) of nopadiene, $n_D^{24}$ 1.5044.

A sample of nopadiene purified by distillation through a 34-in. column (glass helices; 28 theoretical plates) had the following properties: B. P. 179° (738 mm.), 85.5–86.5° (30 mm.); $d_4^{25}$ 0.8842; $n_D^{25}$ 1.5044; $\alpha_D^{23}$ −30.16° (10 cm. tube).

What I claim is:

1. 6,6-dimethyl-2-vinyl-bicyclo [3.1.1]-2-heptene.
2. The process of producing 6,6-dimethyl-2-vinyl-bicyclo [3.1.1]-2-heptene which comprises dehydrating 6,6-dimethyl-2-(2-hydroxyethyl)-bicyclo [3.1.1]-2-heptene by heating with a water-soluble organic diluent at a temperature of 180 to 210° C. in the presence of a basic catalyst of the class consisting of the oxides and hydroxides of metals of groups I to III of the periodic system, and separating the diluent from the heptene by washing with water.

LELAND J. KITCHEN.

REFERENCES CITED

The following references are of record in the file of this patent:

UNITED STATES PATENTS

| Number | Name | Date |
|---|---|---|
| 2,455,110 | Bain et al. | Nov. 9, 1948 |
| 2,465,486 | Rosenthal | Mar. 29, 1949 |

OTHER REFERENCES

Yamamoto et al.: J. Soc. Chem. Ind., Japan (Sept., 1940), pages 279–280B.

Brooks: J. Am. Chem. Soc., vol. 66, 1295–7 (1944).